(12) United States Patent
Maroney et al.

(10) Patent No.: US 6,650,400 B2
(45) Date of Patent: Nov. 18, 2003

(54) OPTICAL FIBRE AMPLIFIERS

(75) Inventors: Andrew V Maroney, South Woodford (GB); Daria Crippa, Chorleywood (GB); Jowan Masum-Thomas, Halstead (GB)

(73) Assignee: Nortel Networks Limited, St. Laurent (CA)

( * ) Notice: Subject to any disclaimer, the term of this patent is extended or adjusted under 35 U.S.C. 154(b) by 50 days.

(21) Appl. No.: 09/880,636

(22) Filed: Jun. 13, 2001

(65) Prior Publication Data

US 2002/0191278 A1 Dec. 19, 2002

(51) Int. Cl.[7] .............................................. H04B 10/12
(52) U.S. Cl. ........................ 355/341.5; 359/341.32; 359/337.21; 772/6; 772/29.022; 772/72; 772/102; 772/92
(58) Field of Search ................ 359/337.21, 337.11, 359/341.5, 333, 341.32; 372/6, 29.022, 72, 107, 102, 92

(56) References Cited

U.S. PATENT DOCUMENTS

| | | | | |
|---|---|---|---|---|
| 4,914,665 A | * | 4/1990 | Sorin | 372/20 |
| 5,243,609 A | * | 9/1993 | Huber | 372/102 |
| 5,268,910 A | * | 12/1993 | Huber | 372/102 |
| 5,341,237 A | * | 8/1994 | Tohmon et al. | 359/341.5 |
| 5,617,244 A | * | 4/1997 | Percival et al. | 359/341.5 |
| 5,710,786 A | * | 1/1998 | Mackechnie et al. | 372/102 |
| 6,049,417 A | * | 4/2000 | Srivastava et al. | 359/337.4 |
| 6,201,637 B1 | * | 3/2001 | Nilsson et al. | 359/169 |
| 2001/0048343 A1 | * | 12/2001 | Islam | 330/4 |
| 2002/0044344 A1 | * | 4/2002 | Terahara | 359/341.1 |

OTHER PUBLICATIONS

Jackson et al. IEEE J of Quantum Electronics, vol. 34 No. 5 May1998.*
Loh et al. Elec. Letts. Jun. 20, 1996 vol. 32 No. 13.*
Yamashita et al. CLEO'98 1889.*
Lauridsen et al. Elec. Letts. Oct. 15, 1998 vol. 34 No. 21.*
Booth et al. IEEE J of Q Electronics, vol. 32 No. 1 Jan. 1996.*

* cited by examiner

Primary Examiner—Thomas G. Black
Assistant Examiner—Stephen Cunningham
(74) Attorney, Agent, or Firm—Barnes & Thornburg

(57) ABSTRACT

An optical amplification system has an active fibre section having an optical fibre 10 and containment means 8, 12 containing light of a specific wavelength within the active fibre section. The specific wavelength of light is the result of the spontaneous transition of photons. The contained photons stimulate further photons emissions, which depopulates energy levels involved in the amplification process.

15 Claims, 4 Drawing Sheets

OPTICAL FIBRE AMPLIFIERS

TECHNICAL FIELD

The invention relates to optical fibre amplification systems and to methods of operating such systems.

BACKGROUND TO THE INVENTION

In optical communications networks, optical signals are transported by optical fibres. With increased demand for optical communications network bandwidth, alternative optical signal transmission wavelengths are being considered. One such alternative band of wavelengths, the so-called S-band, is in the region of 1450–1490 nm. One reason this is an attractive band is because it can give rise to relatively low attenuation losses, of the order of 0.25 dB/Km.

Optical signals in optical communication networks require amplification periodically to offset losses incurred in transmission. One method of amplification is with optical fibre amplifiers. These typically have an active fibre section which comprises a length of optical fibre whose core is doped, generally with a rare earth element. Some form of coupling device is provided which enables light from an excitation source to be 'pumped' into the active fibre. The pump source wavelength is selected so as to excite the ions of the dopant element and raise them to a higher energy level. This level is such that the input optical signal, which is the signal for amplification, stimulates the transition downwards of the ions which occupy it, and photons are emitted. These photons are in phase with the photons of the input signal and, as a result, an amplified signal is output from the active fibre.

An important aspect of the stimulated emission process is the achievement of a dopant ion population inversion at the higher energy level. In other words, in order for the process to succeed, it is necessary to raise a significant proportion of dopant ions to a higher energy level and to keep them there before they spontaneously transit downwards to the lower level.

Erbium doped fibre amplifiers are now in common use. One such amplifier is disclosed in U.S. Pat. Nos. 5,638,204. An alternative active fibre dopant is Thulium, $Tm^{3+}$, which can provide amplification at S-band wavelengths so long as it is incorporated in a fibre core with a low phonon energy such as fluoride glass, tellurite glass or silicate glass. FIG. 1 is an energy level diagram for Thulium doped fluoride glass. Light of an S band wavelength is produced by the stimulated emission from the $E_3$ upper energy level, to the $E_1$ lower energy level, which is not the ground level. A problem with utilising Thulium in this way is that the lifetime of ions in the upper level $E_3$ is much shorter than the lifetime of ions in the lower level $E_1$ so achieving the necessary population inversion can be difficult. For example, for a particular incorporating material and dopant concentration, likely relative lifetimes upper level $E_3$/lower level $E_1$ are ~0.7/9–11 ms.

One way of raising ions from a lower level to a higher level is by means of a so-called up-conversion, that is to say, via an intermediate level $E_2$ and by excited state absorption to the higher level $E_3$, U.S. Pat. No. 5,341,237 discloses an optical element using the Thulium as the dopant, which is driven in an up-conversion manner, with a single excitation source.

However up-conversions tend to require relatively high pump powers and are not a particularly efficient way to proceed. An alternative may be to pump in such a way as to raise the dopant ions directly to the higher level, but lifetime considerations mean that self termination will occur. All these disadvantages are, in essence, a result of a population build up in the lower energy level which may lead to a reduction or loss of population inversion.

OBJECT OF THE INVENTION

An object of the invention is to provide an efficient optical amplification system.

SUMMARY OF THE INVENTION

According to a first aspect, the invention provides an optical amplification system for amplifying an input optical signal, comprising an active fibre section having an optical fibre doped with ions capable of transition from a first energy level to a second, lower energy level, thereby to emit photons at the wavelength of the input optical signal and capable of spontaneous transition from the second energy level to a third, lowest energy level; containment means containing within the active fibre section photons emitted as a result of the spontaneous transitions of dopant ions from the second level to the third level, thereby to stimulate further transitions of dopant ions from the second level to the third level. Thus, the stimulated transitions serve to depopulate the second level. The depopulating has the effect of increasing the efficiency of transitions from the first to the second levels and, as a consequence, the amplifier gains.

Preferably, the optical fibre is doped with Thulium. However, the invention is equally applicable to other dopants.

The optical fibre may have a core of fluoride, tellurite or silica glass.

The containment means may comprise at least one device which reflects light at the wavelength of the spontaneously emitted photons. Preferably, the device is a Bragg optical fibre diffraction grating. Further preferably, the grating wavelength, which may have a 300 nm spread, is selected to contain within the active fibre section photons emitted as a result of spontaneous transitions.

The appropriate spontaneous transition and its associated wavelength is determined by analysing the emission and absorption of the system Thus, the gratings serve to define a cavity in which light at the selected wavelength is virtually 100% contained. The cavity will settle to a steady state rapidly where the losses balance the power in the cavity and then the system will run in an undisturbed way. Any excess light generated within the cavity is not contained but should be of such small amplitude that it will not interfere with the amplification.

The amplification system may comprise pumping means for exciting the dopant ions directly to the first level or via the second level. The latter, in other words an up-conversion, may also involve radiative transitions. The pumping means may pump the active fibre section with whatever wavelength of light or combination of wavelengths of light result in populating the first level. Preferably, the pumping means comprises one pump source.

According to a second aspect, the invention provides an optical amplification system comprising an active fibre section having a doped optical fibre and containment means containing light of a specific wavelength within the active fibre section.

According to a third aspect, the invention provides an optical amplification system comprising an active fibre section having a doped optical fibre including a cavity within which light of a specific wavelength is contained.

According to a fourth aspect the invention provides an optical amplification system comprising an active fibre section having a doped optical fibre from which light of a specific wavelength is emitted and at least one reflection device at an end of the active fibre section for reflecting the specific wavelength of light back along the active section.

According to a fifth aspect, the invention provides an S-band optical amplifier comprising an optical amplification system according to any one of the first, second, third or fourth aspects of the invention.

According to a sixth aspect, the invention provides a multi-band optical amplification system comprising an S-band optical amplifier according to the fifth aspect of the invention and at least one other optical amplifier.

According to seventh and eighth aspects, the invention provides an optical fibre link or a node in an optical network respectively including an optical amplification system according to the first, second or third aspects of the invention.

DESCRIPTION OF THE INVENTION

Figure 1:
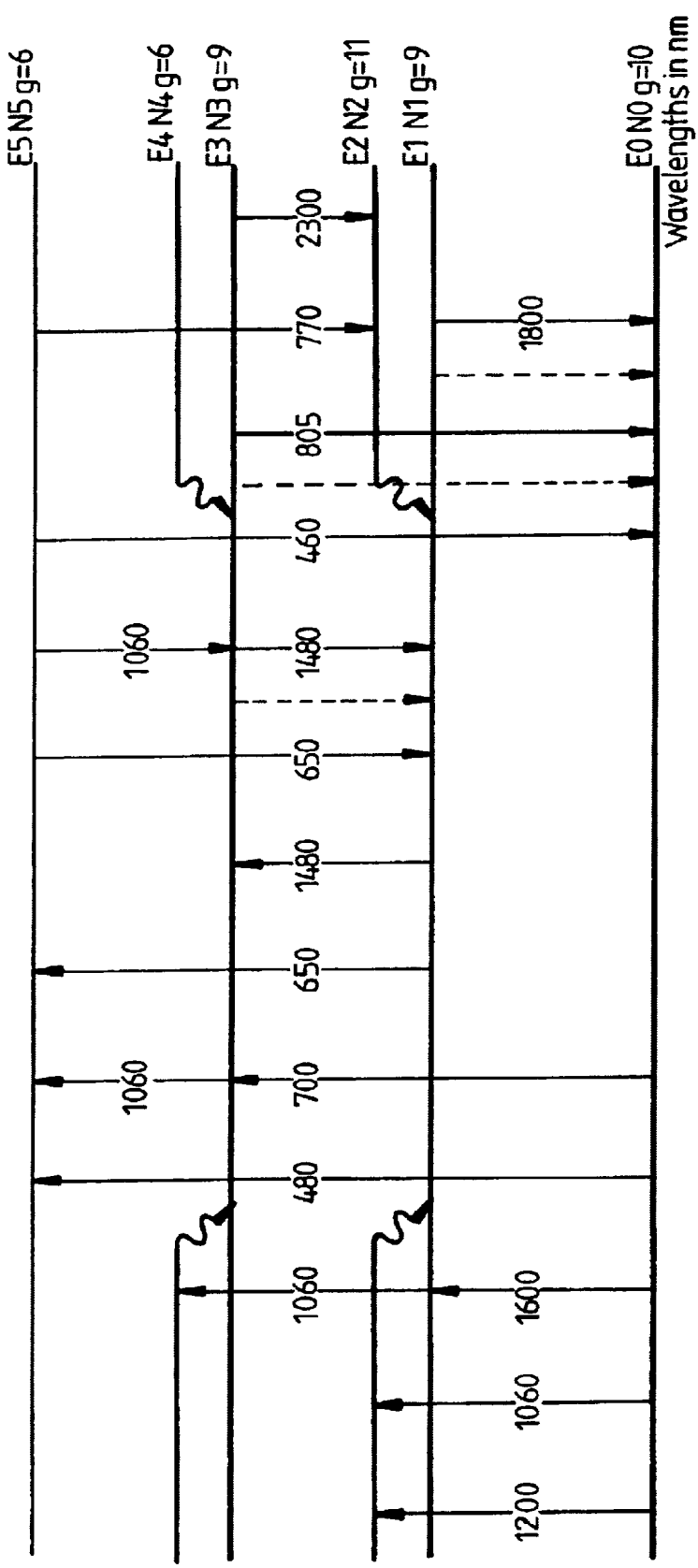
FIG. 1 is an energy level diagram for Thulium doped fluoride glass.

With reference to FIG. 1, Thulium $Tm^{3+}$ exhibits what is often termed four energy level behaviour. Consider, for example, a need to amplify a signal for S-band transmission in an optical communications network of wavelength 1480 nm. Such light is emitted in Thulium doped fluoride glass by the stimulated transition from the $E_3$ to the $E_1$ energy levels. In order to achieve such a transition, the $E_1$ level requires inverse populating with Thulium ions. This may be done by up conversion of Thulium ions from the first, $E_0$ level to the intermediate, $E_2$ level; a non-radiative transition occurs between the $E_2$ and the $E_1$ levels; and from the $E_1$ level to the higher $E_4$ level; again, a non-radiative transition occurs between $E_4$ and the $E_3$ level. The first up-transition is achieved by pumping with excitation light of wavelength 106 nm. The second up-transition is achieved by pumping with light of wavelength 1060 nm. In the case of the invention, such pumping is done with two co-pumped sources; one in a co-pumped configuration and the other in a counter pumped configuration.

Figure 2:
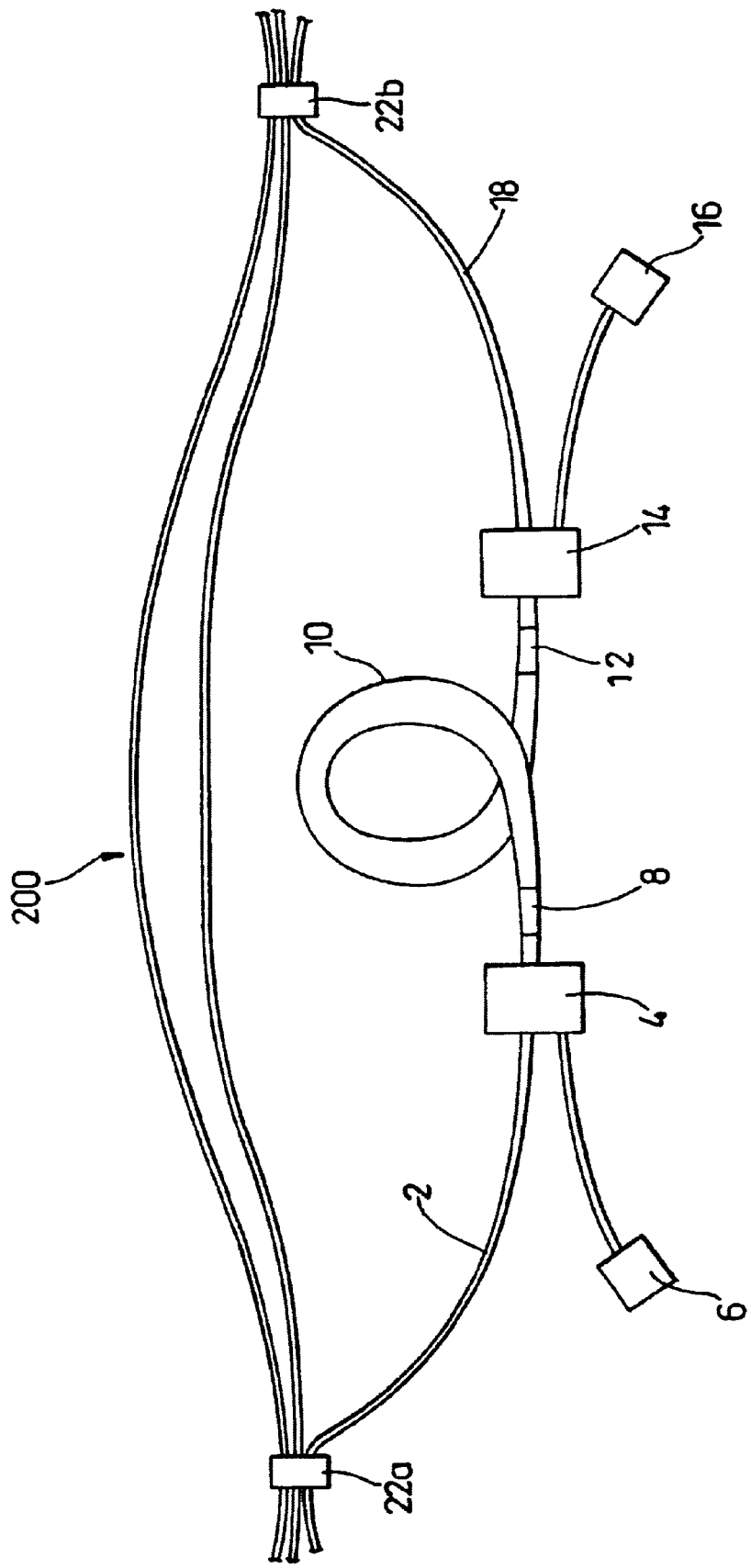
FIG. 2 is a schematic diagram of an optical amplification system according to one aspect of the invention, which forms part of an optical fibre link in an optical fibre network.

With reference to FIG. 2, an input optical signal of wavelength 1460 nm is received on an input optical fibre 2 which is an optical fibre link 20 between two nodes 22 in a network 200. The input optical fibre 2 forms an input to a first coupling device 4. Also input to the coupling device 4 is light from a first laser light pump source 6 of wavelength 1060 nm. The output from the coupling device 4 is connected via a first Bragg optical fibre diffraction grating 8 to an active fibre section 10 which comprises a length of optical fibre having a fluoride glass core doped with Thulium. The other end of the active fibre section is connected via a second Bragg optical fibre diffraction grating 12 to input a second coupling device 14. Also input to the second coupling device 14 is light from a second laser pump source 16 of wavelength 1060 nm. An amplified input optical signal is output from the second coupling device 14 an output optical fibre 18.

Photons of wavelength 1790 nm are emitted as a result of spontaneous transitions of Thuliumions from the $E_1$ to the $E_0$ levels. Each of the first and second Bragg fibre gratings 8, 12 is selected to reflect light at the wavelength of the spontaneously emitted photon. Thus, the Bragg fibre gratings 8, 12 contain the spontaneously emitted photons within the active fibre section 10, reflecting them back and forth. In other words, the Bragg fibre gratings serve to define a cavity.

The spontaneously emitted photons contained within the active fibre section 10 stimulate further transitions of Thuliumions from the $E_1$ to the $E_0$ levels, resulting in further photons. Consequently, the contained spontaneously emitted photons have the effect of depopulating the $E_1$ level. This assists with the creation and maintenance of a population inversion at the $E_3$ level.

The grating wavelength is selected so as to be as close as possible to the spontaneous transition wavelength; in other words, the grating concentrates on reflecting photons which will serve to stimulate further emissions. The wavelength can be ascertained by emission and absorption measurements.

Figure 3:
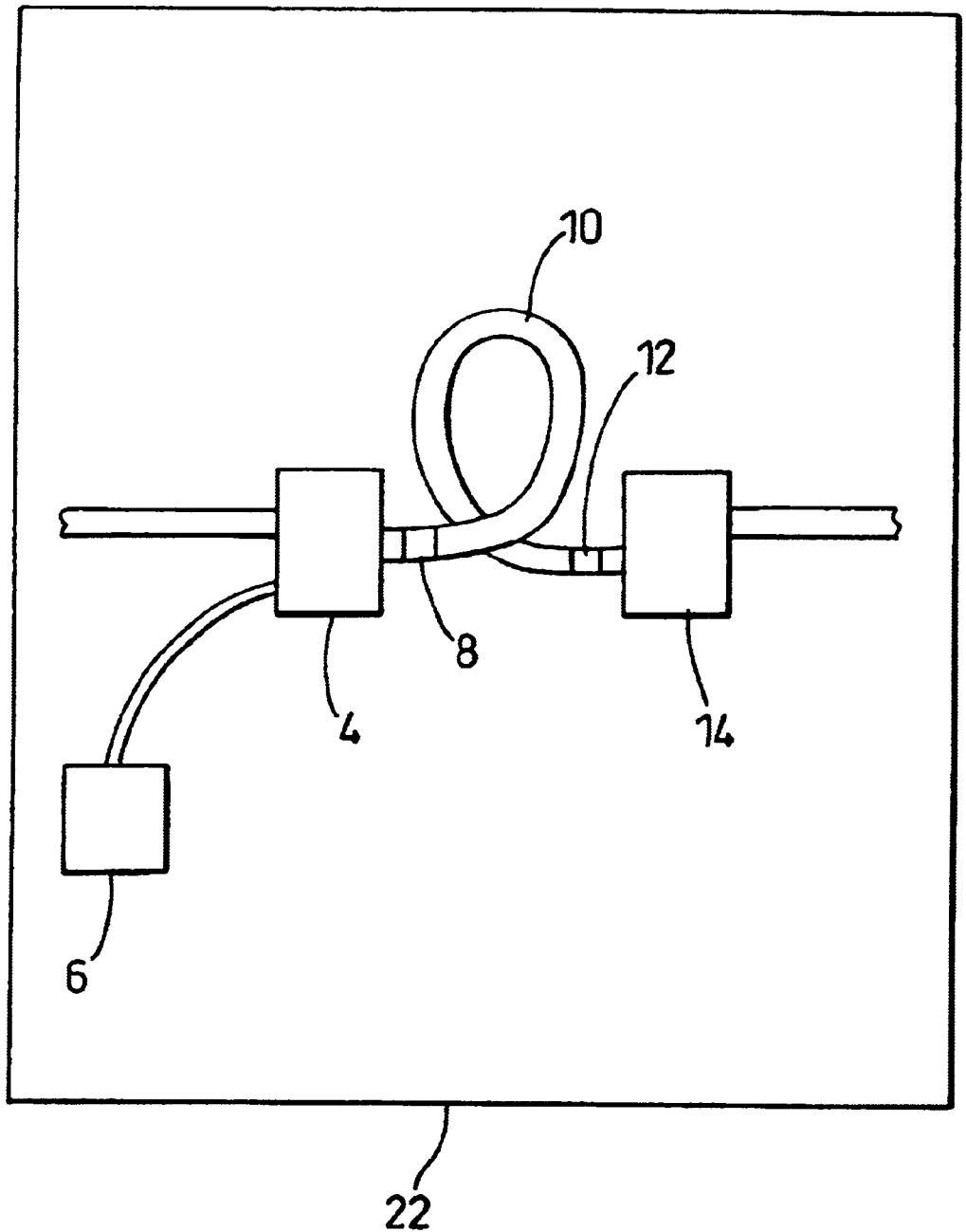
FIG. 3 is a schematic diagram of an optical amplification system according to another aspect of the invention, located at a node in an optical network.

With reference to FIG. 3, an amplification system as described with reference to FIG. 2 (like parts having the same reference numerals), except that it has only a single laser light co-pump source 6 of wavelength 790 nm, is located at a node 22 in an optical fibre network.

Figure 4:
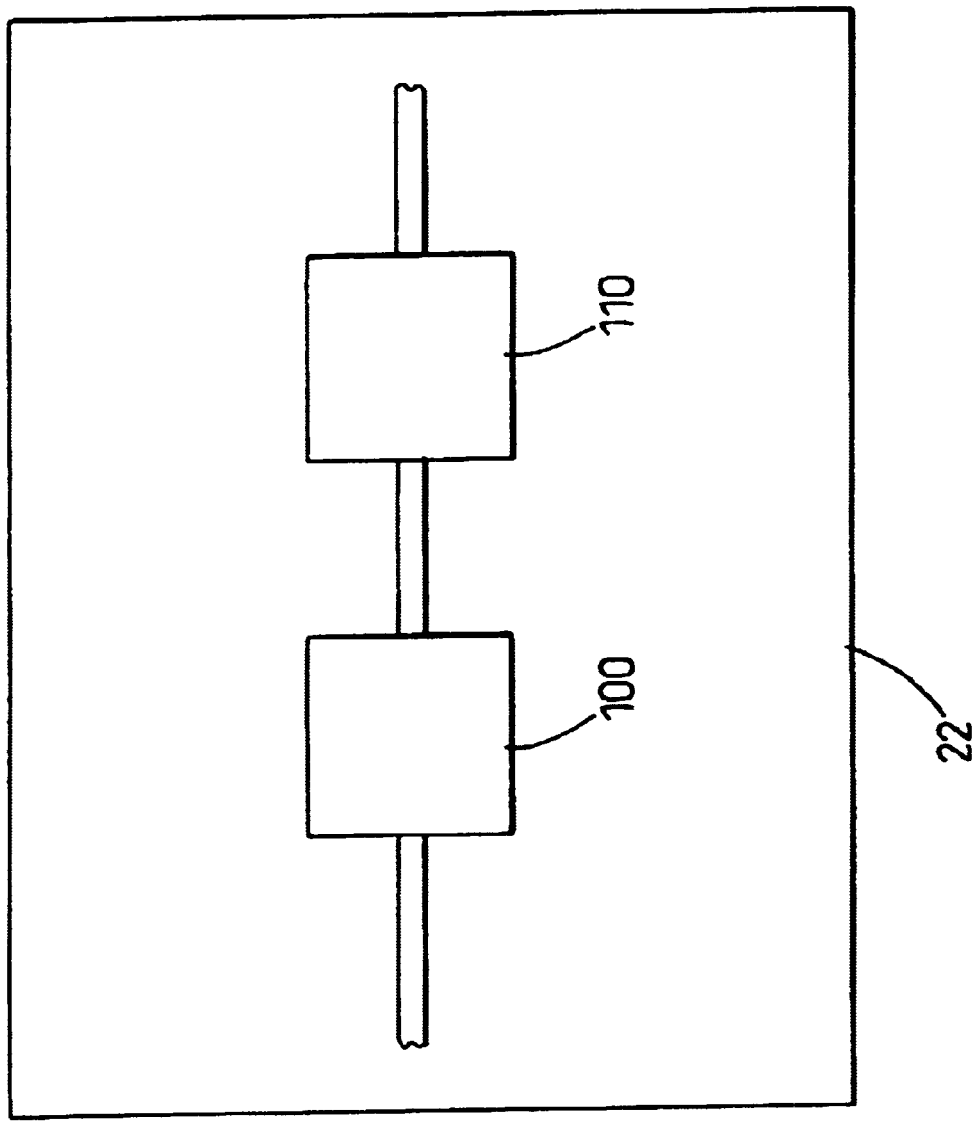
FIG. 4 is a schematic diagram of a multi-wavelength band optical amplifier according to yet another aspect of the invention.

With reference to FIG. 4, a multi-wavelength band amplification system at a node 22 in an optical network utilising multiple band, C-, L- and S-band, transmissions, has two stages: a first S-band amplification stage, incorporating an amplification system as described with reference to FIG. 2, and a second C- and L-band amplification stage, incorporating another amplification system.

What is claimed is:

1. An optical amplification system for amplifying an input optical signal, comprising an active fibre section having an optical fibre doped with ions capable of transition from a first energy level to a second, lower energy level, thereby to emit photons at the wavelength of the input optical signal and capable of spontaneous transition from the second energy level to a third, lowest energy level; means for containing within the active fibre section photons emitted as a result of the spontaneous transitions of dopant ions from the second level to the third level, thereby to stimulate further transitions of dopant ions only from the second level to the third level.

2. An optical amplification system according to claim 1 wherein the optical fibre is doped with Thulium.

3. An optical amplification system according to claim 1 wherein the optical fibre has a core of fluoride, tellurite or silica glass.

4. An optical amplification system according to claim 1 wherein the means for containing comprises at least one device which reflects light at the wavelength of the spontaneously emitted photons.

5. An optical amplification system according to claim 4 wherein the or each device is a Bragg optical fibre diffraction grating.

6. An optical amplification system according to claim 5 wherein the grating wavelength is selected to contain within the active fibre section photons emitted as a result of spontaneous transitions.

7. An optical amplification system according to claim 1 comprising pumping means for exciting the dopant ions directly to the first level or via the second level.

8. An optical amplification system according to claim 7 wherein the pumping means comprises at least one pump light source.

9. An optical amplification system according to claim 8 wherein the pumping means comprises one pump light source.

10. An S-band optical amplifier comprising an optical amplification system according to claim 1.

11. A multi-band optical amplification system comprising an S-band optical amplifier according to claim 1, and at least one other optical amplifier.

12. An optical fibre link including an optical amplification system according to claim 1.

13. A node in an optical network including an optical amplification system according to claim 1.

14. An optical fibre network including at least one optical amplification system according to claim 1.

15. A method of operating an optical amplification system for amplifying an input optical signal, comprising an active fibre section having an optical fibre doped with ions capable of transition from a first energy level to a second, lower energy level, thereby to emit photons at the wavelength of the input optical signal and capable of spontaneous transition from the second energy level to a third, lowest energy level; the method involving the step of containing within the active fibre section photons emitted as a result of spontaneous transitions thereby to stimulate the transition of further dopant ions only from the second level to the third level.

* * * * *